United States Patent
Ahmed et al.

(10) Patent No.: US 11,086,868 B2
(45) Date of Patent: Aug. 10, 2021

(54) MATERIALIZED VIEW REWRITE TECHNIQUE FOR ONE-SIDED OUTER-JOIN QUERIES

(71) Applicant: Oracle International Corporation, Redwood Shores, CA (US)

(72) Inventors: Rafi Ahmed, Fremont, CA (US); Randall Bello, Austin, TX (US); Andrew Witkowski, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/667,527

(22) Filed: Oct. 29, 2019

(65) Prior Publication Data

US 2021/0124742 A1  Apr. 29, 2021

(51) Int. Cl.
*G06F 16/245* (2019.01)
*G06F 16/2453* (2019.01)

(52) U.S. Cl.
CPC .. *G06F 16/24539* (2019.01); *G06F 16/24544* (2019.01)

(58) Field of Classification Search
None
See application file for complete search history.

(56) References Cited

U.S. PATENT DOCUMENTS 6,449,605 B1 * 9/2002 Witkowski ........ G06F 16/24537
6,477,525 B1 * 11/2002 Bello ................ G06F 16/24539
8,359,325 B1 * 1/2013 Gui ........................ G06F 16/986
  707/760
2003/0093415 A1   5/2003 Larson et al.
2006/0074901 A1 * 4/2006 Pirahesh ............ G06F 16/24544
2007/0192283 A1 * 8/2007 Larson ................ G06F 16/2453
2008/0133461 A1 * 6/2008 Nica .................. G06F 16/24537
2015/0339349 A1 * 11/2015 Ahmed ............. G06F 16/24556
  707/714

(Continued)

OTHER PUBLICATIONS

Oracle Database, "SQL Reference", Lead, Syntax, dated Dec. 2005, 2 pages.

(Continued)

*Primary Examiner* — Son T Hoang
(74) *Attorney, Agent, or Firm* — Hickman Becker Bingham Ledesma LLP

(57) ABSTRACT

A one-sided outer-join-based query is rewritten using a materialized view (MV), the definition of which includes the join but does not include a filter predicate from the query. The rewritten query nullifies data from the include-matching table, included in the MV, that does not satisfy the filter predicate. To improve accuracy of the query results, certain rows are removed from intermediate results of the query. To facilitate revising the query results for accuracy, the MV includes a unique column from the include-all table and also an indicator column that indicates whether a given row of the MV is an inner-join-type row or an anti-join-type row. The rewritten query adjusts the indicator values, in the indicator column, of MV rows that do not satisfy the filter to reflect a modified anti-join-type indicator value. Based on the modified indicator values and unique columns from include-all tables, accuracy of query results is attained.

22 Claims, 9 Drawing Sheets

(56) References Cited

U.S. PATENT DOCUMENTS

2021/0019318 A1\* 1/2021 Leung .............. G06F 16/24539

OTHER PUBLICATIONS

Oracle Database, "SQL Reference", LAG, Syntax, dated Dec. 2005, 2 pages.
Wrembel, Robert, "Data Warehouse Performance: Selected Techniques and Data Structures", First European Summer School, eBISS, dated Jul. 2011, vol. 96, pp. 27-62.
Larson et al., "View Matching for Outer-Join Views", Proceedings of the 31st VLDB Conference, ACM, dated Aug. 30, 2005, pp. 445-456.
Gebaly et al., "In-Browser Split-Execution Support for Interactive Analytics in the Cloud", arxiv.oorg, dated Apr. 24, 2018, 16 pages.

\* cited by examiner

400

```
SELECT * FROM MV1;
```

| | T1_RID 402 | B1 404 | B2 406 | C2 408 | SM 410 | CNT 412 | IVAL 414 |
|---|---|---|---|---|---|---|---|
| 420 | AB | 2 | 7 | 7 | 1 | 1 | 1 |
| 421 | AI | 13 | 8 | 5 | 2 | 1 | 1 |
| 422 | AB | 2 | 6 | | 1 | 1 | 1 |
| 423 | AC | 5 | 7 | 8 | 3 | 1 | 1 |
| 424 | AD | 8 | | | 11 | 1 | 0 |
| 425 | AE | 12 | | | 7 | 1 | 0 |
| 426 | AB | 2 | 8 | 9 | 1 | 1 | 1 |
| 427 | AF | 11 | 7 | 11 | 5 | 1 | 1 |
| 428 | AA | 3 | 6 | 15 | 6 | 1 | 1 |
| 429 | AI | 13 | 9 | 8 | 2 | 1 | 1 |
| 430 | AF | 11 | 6 | 3 | 5 | 1 | 1 |
| 431 | AG | 8 | 6 | 7 | 8 | 1 | 1 |
| 432 | AH | 12 | 8 | 5 | 5 | 1 | 1 |
| 433 | AH | 12 | 9 | 8 | 5 | 1 | 1 |
| 434 | AI | 13 | 9 | 4 | 3 | 1 | 1 |
| 435 | AJ | 16 | | | 3 | 1 | 0 |
| 436 | AA | 3 | 6 | 10 | 6 | 1 | 1 |

FIG. 5

INTERMEDIATE RESULTS SET 500

| | T1_RID 502 | B1 504 | B2 506 | C2 508 | SM 510 | CNT 512 | IVal 514 | MR 516 |
|---|---|---|---|---|---|---|---|---|
| 520 | AA | 3 | 6 | 15 | 6 | 1 | 1 | 1 |
| 521 | AA | 3 | 6 | 10 | 6 | 1 | 1 | 2 |
| 522 | AB | 2 | | | 1 | 1 | -1 | -1 |
| 523 | AB | 2 | | | 1 | 1 | -1 | 1 |
| 524 | AB | 2 | 6 | | 1 | 1 | 1 | 2 |
| 525 | AC | 5 | | | 3 | 1 | -1 | 2 |
| 526 | AD | 8 | | | 11 | 1 | 0 | 2 |
| 527 | AE | 12 | | | 7 | 1 | 0 | 2 |
| 528 | AF | 11 | | | 5 | 1 | -1 | 1 |
| 529 | AF | 11 | 6 | 3 | 5 | 1 | 1 | 2 |
| 530 | AG | 8 | 6 | 7 | 8 | 1 | 1 | 2 |
| 531 | AH | 12 | | | 5 | 1 | -1 | -1 |
| 532 | AH | 12 | | | 5 | 1 | -1 | 2 |
| 533 | AI | 13 | | | 2 | 1 | -1 | -1 |
| 534 | AI | 13 | | | 2 | 1 | -1 | -1 |
| 535 | AI | 13 | | | 3 | 1 | -1 | 2 |
| 536 | AJ | 16 | | | 3 | 1 | 0 | 2 |

FIG. 7

```
SELECT * FROM MV2;
```

| | B 702 | X 704 | Y 706 | SM 708 | CNT 710 | IVAL 712 |
|---|---|---|---|---|---|---|
| 720 | 2 | 7 | 5 | 1 | 1 | 1 |
| 721 | 13 | 8 | 5 | 2 | 1 | 1 |
| 722 | 5 | 7 | 8 | 3 | 1 | 1 |
| 723 | 8 | | | 11 | 1 | 0 |
| 724 | 12 | | | 7 | 1 | 0 |
| 725 | 11 | 7 | 11 | 5 | 1 | 1 |
| 726 | 3 | 6 | 5 | 6 | 1 | 1 |
| 727 | 8 | 6 | 7 | 8 | 1 | 1 |
| 728 | 12 | 8 | 5 | 5 | 1 | 1 |
| 729 | 16 | | | 3 | 1 | 0 |

700

| | B 702 | X 704 | Y 706 | SM 708 | CNT 710 | IVAL 712 |
|---|---|---|---|---|---|---|
| 720 | 2 | 7 | 5 | 1 | 1 | 1 |
| 721 | 13 | 8 | 5 | 2 | 1 | 1 |
| 722 | 5 | | | 3 | 1 | 1 |
| 723 | 8 | | | 11 | 1 | 0 |
| 724 | 12 | | | 7 | 1 | 0 |
| 725 | 11 | | | 5 | 1 | 1 |
| 726 | 3 | 6 | 5 | 6 | 1 | 1 |
| 727 | 8 | | | 8 | 1 | 1 |
| 728 | 12 | 8 | 5 | 5 | 1 | 1 |
| 729 | 16 | | | 3 | 1 | 0 |

730

MATERIALIZED VIEW REWRITE TECHNIQUE FOR ONE-SIDED OUTER-JOIN QUERIES

FIELD OF THE INVENTION

The present invention relates to utilizing materialized views to rewrite queries and, more specifically, to rewriting a one-sided outer-join-based query using a materialized view, where the materialized view's definition does not include a filter predicate that is applied in the query.

BACKGROUND

Materialized views can be powerful tools for optimizing query execution in a database management system. Specifically, a materialized view (MV) that captures the results of one or more expensive operations can be used to rewrite a query that requires execution of the one or more expensive operations, which removes the need to perform the expensive operations in connection with executing the query. However, creation of an MV that captures complicated and/or expensive database operations is generally very expensive. Thus, it is beneficial to formulate MVs such that the largest possible number of queries can utilize the MV for query execution.

Join operations can be particularly expensive to compute from base tables. Thus, MVs that materialize join operations have high potential value in optimizing join-based queries. However, very few database vendors allow MV definitions to include one-sided outer-join operations (such as a left outer-joins or a right outer-joins). At least one existing database management system allows one-sided outer-join operations in MV definitions. However, in this system, a query can only be rewritten to use a one-sided outer-join-based MV when:

(a) the MV includes sufficient data to answer the query; and
  (b) predicates in the query and in the MV definition exactly match, with certain minor exceptions.

In other words, this database management system does not allow rewriting a query to use an MV that is more general (with respect to filter predicates) than the query being rewritten.

However, including filter predicates in MV definitions restricts the applicability of the MVs and, accordingly, their value in the database management system. Thus, it would be beneficial to enable rewrite of a one-sided outer-join-based query, which includes one or more filter predicates, using an MV that is more general than the query (i.e., that has a definition that does not include the one or more filter predicates).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 5 depicts example intermediate results for a query that is rewritten to use a materialized view.

FIG. 7 depicts example contents of a materialized view and also example intermediate results for a query that is rewritten to use a materialized view.

DETAILED DESCRIPTION

Figure 1:
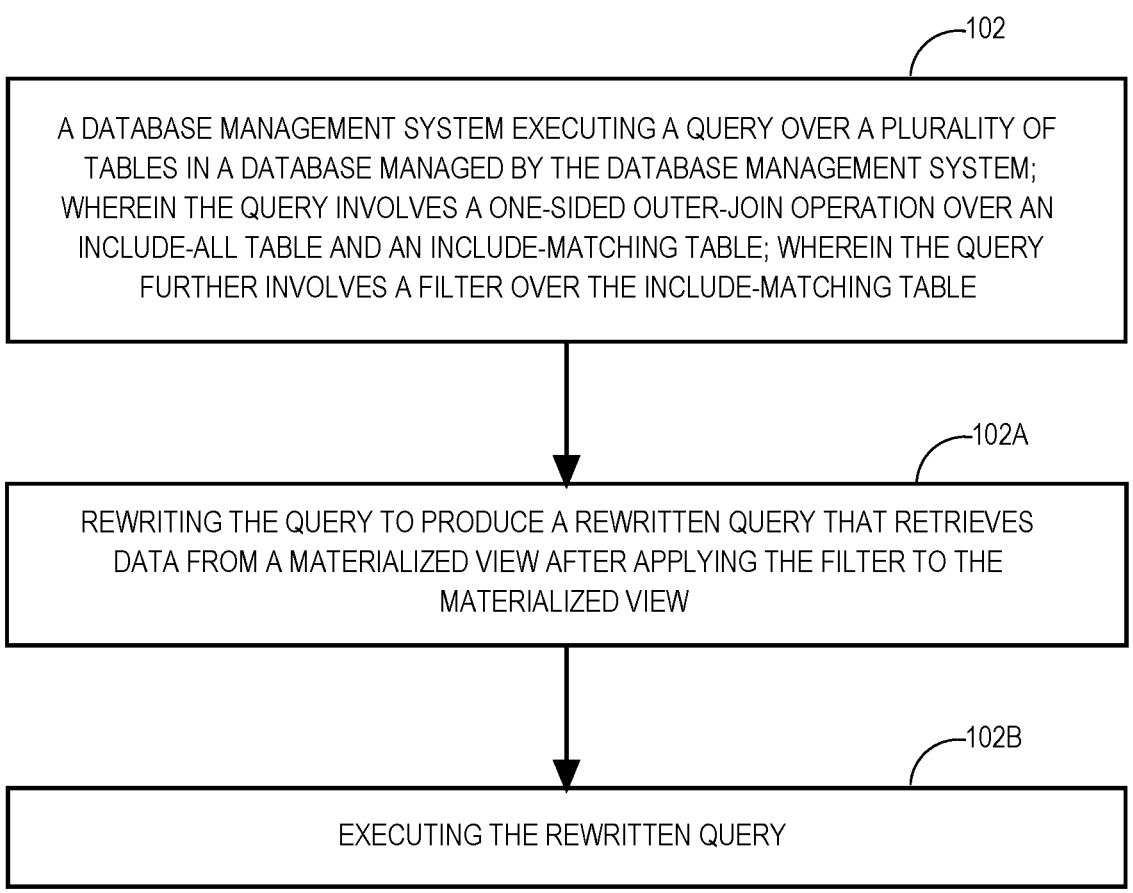
FIG. 1 depicts a flowchart for rewriting a query, which involves a one-sided outer-join predicate and a filter predicate, using a more general materialized view that materializes the one-sided outer-join.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques shall be described herein for rewriting a query, which involves a one-sided outer-join operation (i.e., a left or right outer-join), using a materialized view (MV) that (a) materializes the one-sided outer-join operation, and (b) is more general than the query. Specifically, an MV is more general than a query when one or more filter predicates that are applied in the query are not applied in the definition of the MV. Thus, using the techniques described herein, MVs that materialize one-sided outer-join operations may be written such that the MV definitions include no (or unified) filter predicates. These more general join-based MVs may be used to speed up the execution of a greater variety of queries that use the materialized joins.

Outer Joins

An outer join is a JOIN operation that joins two tables based on a specified join predicate and preserves rows, of one or both of the two tables, that do not join with any rows of the other table. A one-sided outer join preserves all qualified rows including unmatched rows from a first ("include-all") table, joining them with a NULL row in the shape of the second ("include-matching") table. (A qualified row of an include-all table is a row that satisfies filter predicate(s), if any, applicable to the include-all table.) Thus, in a one-sided outer join, rows from the table of one side of the join are always included in the results, while rows from the table of the other side of the join are only included when they match the join key of at least one row from the other side of the join. The table on the side whose rows are all included in the results of the outer join is referred to herein as the "include-all" table. The table on the side whose rows are included in the results only when they match the join key of at least one row from the other side of the join is referred to herein as the "include-matching" table. Thus, in a left outer-join, the left-side table is the include-all table while the right-side table is the include-matching table. Conversely, in a right outer-join, the right-side table is the include-all table while the left-side table is the include-matching table. An inner join is a JOIN operation that joins two tables based on a specified join predicate and only preserves those rows, of the two tables, that join with one or more rows of the other table.

The following example query, "Q0", illustrates a simple query with a left outer join. The two example tables on which Q0 is defined are also included below.

(Q0)
SELECT Tab1.A, Tab1.B, Tab2.C, Tab2.D
FROM Tab1, Tab2
WHERE Tab1.B=Tab2.C (+);

TABLE 1

| A | B |
|---|---|
| 1 | 4 |
| 2 | 4 |
| 3 | 6 |
| 4 | 5 |

TABLE 2

| C | D |
|---|---|
| 4 | 8 |
| 6 | 9 |
| 6 | 1 |
| 7 | 2 |

The following results set shows the result of Q0 based on the example tables, Tab1 (the "include-all" table of the join) and Tab2 (the "include-matching" table of the join). All rows of Tab1 are preserved in the results set. Further, some of the rows of Tab1 are duplicated in the results set because of the many-to-many nature of the join. Specifically, the third row of Tab1 is duplicated because it joins with two rows of Tab2. For the last row of Tab1, which has no matching row in Tab2, the columns of Tab2 are given NULL values (i.e., are nullified) in the result.

| A | B | C | D |
|---|---|---|---|
| 1 | 4 | 4 | 8 |
| 2 | 4 | 4 | 8 |
| 3 | 6 | 6 | 9 |
| 3 | 6 | 6 | 1 |
| 4 | 5 | NULL | NULL |

Note that, if there were a unique constraint on Tab2.0 in the join predicate of Q0, the left outer-join on Tab1.B=Tab2.0 would be a many-to-one-type join. In this case, there would be no duplication of Tab1 rows.

Outer-Join-Based Materialized Views

An outer-join-based materialized view is generated based on a join predicate between two tables. Herein, specific examples shall be given using left outer-join operations to illustrate one-sided outer-join operations. However, the techniques described herein are equally applicable to right outer-join operations. Further, embodiments are described herein using examples of joins between two tables. However, the techniques described herein are equally applicable to joins between any number of tables.

Consider two tables T1 and T2 and a left outer-join predicate for an example materialized view: T1.x=T2.y (+). In this example, T1 is the "left" table (also the "include-all" table) and T2 is the "right" table (also the "include-matching" table) in the example left outer-join predicate. Note that the "(+)" notation is placed near a reference to a table, of the join, from which all rows need not be included in the join results (hence the "include-matching" label on the right table). Thus, the example join predicate is a left-outer join because the rows in the right table are indicated to be optional and every row of the left table is preserved whether or not every row of the left table joins with any row of the right table (hence the "include-all" label on the left table). When a row from the left table does not join with any row of the right table, then the values of the columns originating from the right table are nullified in the resulting row, as indicated in the last row of the example result set of Q0, above.

When there are no uniqueness constraints on either T1.x or T2.y, then the left outer-join, having an equality-based join predicate, is considered to be many-to-many. In the case of a many-to-many left outer-join, rows of both tables may be duplicated in the left outer-join results. If T1.x is unique to left table T1, then the left outer-join is considered to be one-to-many, and the results of the join could potentially include duplicate rows of only the left table. If T2.y is unique to right table T2, then the left outer-join is considered many-to-one, and the results of the join could potentially include duplicate rows of only the right table (but not duplicates of rows of the left table). If both T1.x and T2.y are unique, then the left outer-join is considered one-to-one, and rows of neither table can be duplicated.

Rows, from the include-all table, in the result set of a one-sided outer-join are included in the result set whether or not they match with one or more rows of the include-matching table. It is useful for techniques described herein to know whether the include-matching row, of a given row in the result set of a join, matched with an include-matching row. Thus, according to an embodiment, an MV definition that is based on a left outer-join contains an indicator value (IVal) column for each left outer join predicate, which may also be referred to as an inner-join indicator (IJI) column. An IVal of 1 indicates an inner-join-type row (i.e., an include-all table row that has matched with an include-matching table row), and an IVal of 0 indicates an anti-join-type row (i.e., an include-all table row that has not matched with an include-matching table row). Indicator values in the IVAL column can be used to derive an inner-join set from a materialized outer-join set.

Thus, in a results set of a one-sided outer-join operation, each include-all table row is either (A) reflected in one or more rows of the result set because it joined with one or more rows of the include-matching table or (B) included once in the result set because the include-all table row did not match with any row of the include-matching table. In other words, in a one-sided outer-join result set, an include-all table row should appear in a results set as part of either (A) one or more inner-join-type rows (IVal=1) or (B) exactly one anti-join-type row (IVal=0). A results set that satisfies these qualifications is referred to herein as "integrated". An incorrect results set (i.e., that does not satisfy these qualifications, e.g., because an include-all table row appears in the set (a) as part of both an inner-join-type row and an anti-join-type row, and/or (b) as part of multiple anti-join-type rows) is referred to herein as "unintegrated".

Rewriting an Outer-Join-Based Query

Using the techniques described herein, when a one-sided outer-join-based query applies a filter predicate to the include-matching table of the join (such as the right table of a left outer-join), the query is rewritten to use an MV, the definition of which does not include the filter predicate.

Specifically, the following represents an embodiment of a six-phase technique for rewriting a query, with a many-to-many or one-to-many one-sided outer-join, based on an MV.
1. Apply, on the MV, filter predicates defined on inner-joined or include-all tables in the query.
2. For each row of the MV, and for each one-sided outer-join in the MV do: if it is an inner-join row, and the row does not satisfy the filter predicates specified on the include-matching table in the query, then (A) nullify the columns coming from the include-matching table, (B) nullify the aggregate functions defined on columns of the include-matching table, and (C) mark the row as a modified anti-join (MAJ) row.
3. For each partition formed by the list of unique columns of include-all and inner-joined tables do: if the partition contains only MAJ rows, then put a marker on one of the MAJ rows.
4. Filter out all unmarked MAJ rows.
5. Perform filtering and joins with other tables not referenced in the MV definition, if needed.
6. Do re-computation of group-by and aggregation on the group-by columns specified in the query.

Furthermore, the following represents an embodiment of a four-phase technique for rewriting a query, with a many-to-one one-sided outer-join, based on an MV
1. Apply, on the MV filter, predicates defined on include-all and inner-joined tables in the query.
2. For each row of the MV and for each one-sided outer-join in the MV do: if it is an inner-join row, and the row does not satisfy the filter predicates specified on the include-matching table in the query, then (A) nullify the columns coming from the include-matching table and (B) nullify the aggregate functions defined on columns of the include-matching table.
3. Perform filtering and joins with other tables not referenced in the MV definition, if needed.
4. Do re-computation of group-by and aggregation on the group-by columns specified in the query.

Each of the phases of the above two techniques shall be described in further detail hereafter.

FIG. 1 depicts a flowchart 100 for rewriting a query, which involves a one-sided outer-join predicate and a filter predicate, using a more general materialized view that materializes the one-sided outer-join. At step 102, a database management system executes a query over a plurality of tables in a database managed by the database management system, where the query involves a one-sided outer-join operation over an include-all table and an include-matching table, and where the query further involves a filter over the include-matching table. For example, a database management system 210 (FIG. 2) receives, from a database client running on client device 240, the following query, "Q1", over tables T1 and T2 stored in database 232 on storage 230:

(Q1)
SELECT T1.b1, T2.c2, SUM(T1.d1), COUNT(T1.d1)
FROM T1, T2
WHERE T1.a1 = T2.a2 (+) and T2.b2 (+) = 6
GROUP BY T1.b1, T2.c2;

The following example queries are counterparts to Q1 in ANSI syntax, where "Q1 ANSI LEFT" is a representation of the left outer join in Q1, and "Q1 ANSI RIGHT" is a representation of Q1 with the outer join represented as a right outer join. That is, Q1, Q1 ANSI LEFT, and Q1 ANSI RIGHT are semantically equivalent.

(Q1_ANSI_LEFT)
SELECT T1.b1, T2.c2, SUM(T1.d1), COUNT(T1.d1)
FROM T1 LEFT OUTER JOIN T2 ON (T1.a1 = T2.a2 and T2.b2 = 6)
GROUP BY T1.b1, T2.c2;
(Q1_ANSI_RIGHT)
SELECT T1.b1, T2.c2, SUM(T1.d1), COUNT(T1.d1)
FROM T2 RIGHT OUTER JOIN T1 ON (T1.a1 = T2.a2 and T2.b2 = 6)
GROUP BY T1.b1, T2.c2;

Q1 involves a left outer-join over left table T1 (the "include-all" table) and right table T2 (the "include-matching" table), as indicated by the join predicate T1.a1=T2.a2 (+). The results of Q1 include b1 from table T1, c2 from table T2, a sum-type aggregation of d1 from table T1, and also a count-type aggregation of d1. Further, Q1 involves a filter predicate over the right table T2, as indicated by the filter predicate T2.b2 (+)=6. Because Q1 involves a left outer-join, the results of this query will include all results from table T1 whether or not they join with any row from table T2. Because table T2 is the include-matching table of the join operation, rows of table T2 that do not match with at least one row from table T1 are omitted from the results set of Q1. The database management system runs Q1.

Steps 102A and 102B are involved in the database management system executing the query. Specifically, at step 102A, the query is rewritten to produce a rewritten query that retrieves data from a materialized view after applying the filter to the materialized view. For example, database 232 stores a materialized view, "MV1", with the following definition:

Create materialized view MV1 ... AS
SELECT T1.rowid T1RID, T1.b1, T2.b2, T2.c2, SUM(T1.d1) sm, COUNT(T1.d1)
    cnt, NVL2(T2.rowid, 1, 0) IVAL
FROM T1, T2
WHERE T1.a1 = T2.a2 (+)
GROUP BY T1.rowid, T1.b1, T2.b2, T2.c2, NVL2(T2.rowid, 1, 0);

In connection with executing Q1, a rewrite module of database server instance 222 rewrites Q1 to retrieve data from MV1, which is based on the same join predicate (T1.a1=T2.a2 (+)) as Q1. According to an embodiment, MV1 is more general than Q1, i.e., MV1 does not include the filter predicate (in this case, T2.b2 (+)=6 applied to the right table) that is included in Q1. Nevertheless, the database management system determines that MV1 has sufficient data for Q1 based on the matching join predicates.

At step 102B, the rewritten query is executed. For example, the database management system executes the rewritten query (step 102A).

Figure 3:
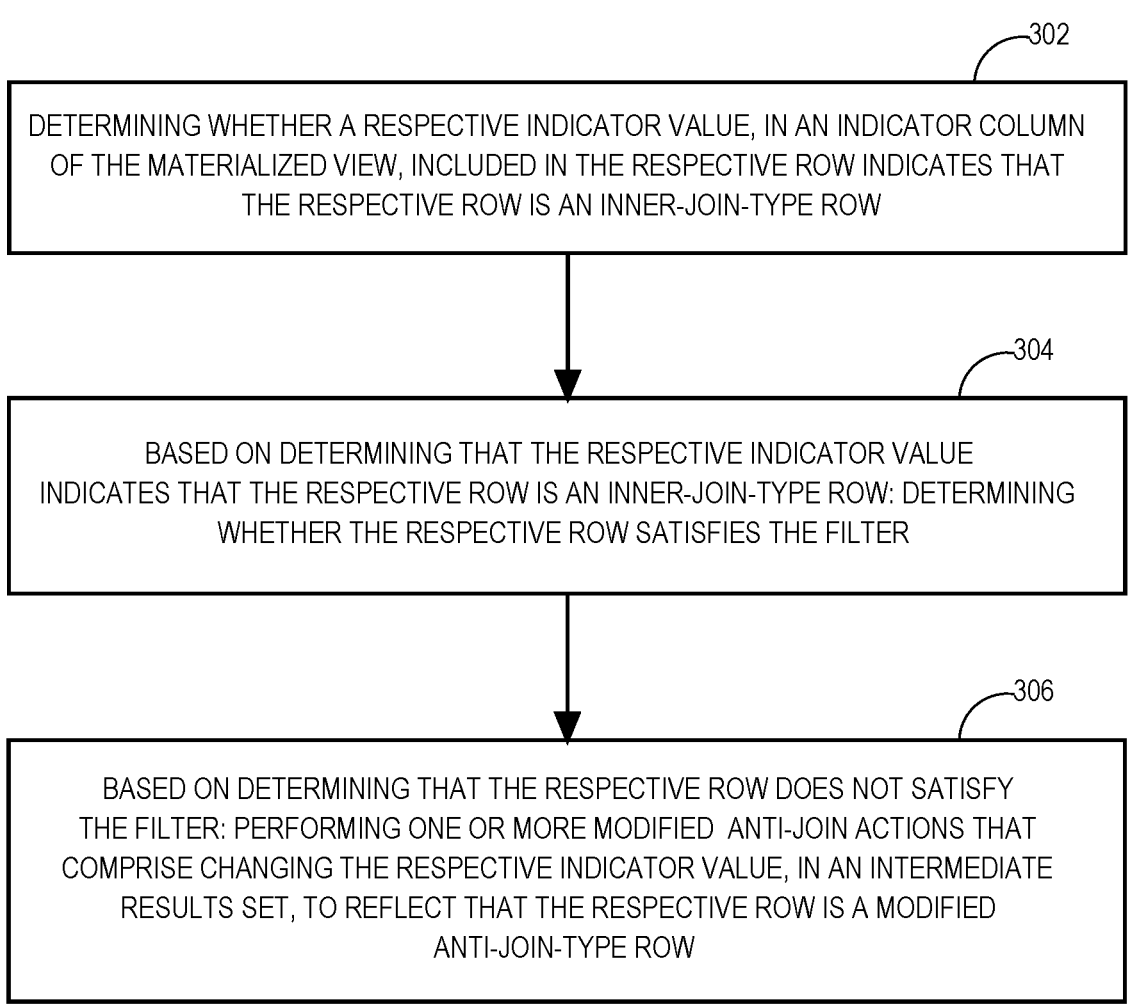
FIG. 3 depicts a flowchart for executing a rewritten query that utilizes a materialized view and involves a many-to-many-type or one-to-many-type one-sided join operation.

Query Rewrite with a Many-to-Many-Type or a One-to-Many-Type One-Sided Outer-Join FIG. 3 depicts a flowchart 300 for executing a rewritten query that utilizes a materialized view and involves a many-to-many-type or one-to-many-type one-sided join operation, according to an embodiment. Specifically, after a filter predicate from the original query is applied to the join operation results, the resulting row set should be integrated, as described in detail above. However, results of join operations that are many-to-many-type joins or one-to-many-type joins potentially include one or more rows with data from the include-all table that match with include-matching table data that does not satisfy a filter predicate in the query. Thus, after application of a filter predicate over data from the include-matching table of the one-sided join, the resulting row set may be unintegrated.

Figure 4:
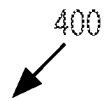
FIG. 4 depicts example contents of a materialized view.

To illustrate, FIG. 4 depicts example contents 400 of MV1, with rows 420-436 and columns 402-414, where the join operation is a many-to-many type one-sided outer-join. In MV1 contents 400, row 420 comprises a match between (a) a row of left table T1 with a row identifier (RID) of 'AB' and (b) a row of right table T2 with a B2 value of '7'. Thus, row 420 is an example of a join operation result row that comprises data from the include-matching table that does not satisfy the filter predicate in Q1 (T2.b2 (+)=6). Further, row 422 of MV1 contents 400 comprises a match between (a) the same row of table T1 with an RID of 'AB' and (b) a second row of right table T2 with a B2 value of '6'. Thus, row 422 is an example of a one-sided outer-join operation result row that comprises data from the include-matching table that satisfies the filter predicate in Q1 (T2.b2 (+)=6).

After application of the filter predicate from Q1 to contents 400, row 420 ceases to be an inner-join-type row while row 422 continues to be an inner-join-type row. Because the query results include an inner-join-type row 422 with the same data from table T1 as row 420, the results are unintegrated. The results are integrated, in part, by removing row 420 from the query results.

In flowchart 300, the steps are applicable to each row in the materialized view. Flowchart 300 is described below using the example query Q1, and also example contents 400 of MV1. Note that contents 400 of MV1 include a null value in the C2 column, in row 422, because of a null value present in the corresponding column of table T2. Furthermore, anti-join-type rows 424, 425, and 435 have null values for data from table T2 because they did not join with any rows from that table. As shown in FIG. 4, MV1 includes a $T1_{RID}$ column that is unique to table T1 and also an IVAL column. According to embodiments, any column from the include-all table that is unique in that table may be used in the MV, and embodiments are not limited to using row identifiers for the unique include-all table values. The $T1_{RID}$ column and the IVAL column, in MV1, facilitate integration of the query results after application of the filter predicate in Q1 to the MV data.

If there are more than two tables in the MV definition, then a unique column of every table—irrespective of whether it is an include-all table or not, with one exception—that participates in a many-to-many or one-to-many join is included in the MV definition.

Many-to-Many or One-to-Many: Phase One

Figure 2:
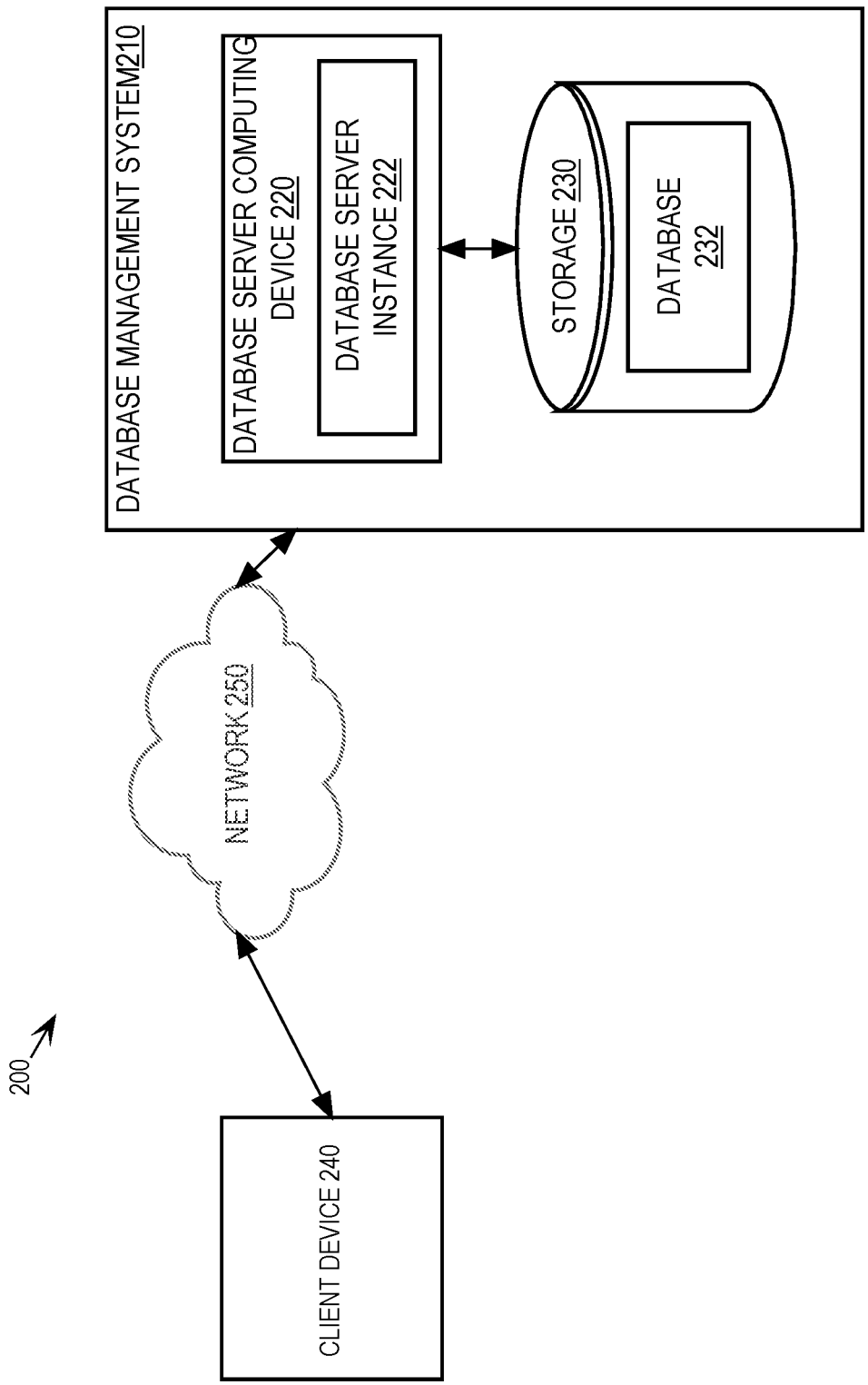
FIG. 2 is a block diagram of a database management system.

According to an embodiment, prior to processing intermediate results from MV1 in connection with a query having the same one-sided outer-join predicate as MV1, a database management system, such as database management system 210 of FIG. 2, applies any filter predicates, from the query, that are defined on inner-joined or include-all tables in the query, as specified in the respective first phases of the multi-phase techniques for rewriting queries for both many-to-many and many-to-one type outer joins indicated above. To illustrate, the database management system processes the following query, "Q1B", which is similar to Q1 but also includes a filter predicate over T1.e (i.e., T1.e=5).

---
(Q1B)

SELECT T1.b1, T2.c2, SUM(T1.d1), COUNT(T1.d1)
FROM T1, T2
WHERE T1.a1 = T2.a2 (+) and T2.b2 (+) = 6 and T1.e = 5
GROUP BY T1.b1, T2.c2;
---

Thus, Q1B includes a filter predicate that is over the left (include-all) table of the outer join expression. According to an embodiment, the database management system applies the filter predicate for table T1 prior to performing the steps of flowchart 300 in FIG. 3.

Many-to-Many or One-to-Many: Phases Two and Three

At step 302, it is determined whether a respective indicator value, in an indicator column of the materialized view, included in the respective row indicates that the respective row is an inner-join-type row. For example, the database management system determines whether a particular row, such as row 420 in FIG. 4, is associated with an IVal, from the IVAL column, that indicates that it is an inner-join-type row. In the case of row 420, it is associated in MV1 with an IVal of '1', and, as such, is an inner-join-type row.

At step 304, based on determining that the respective indicator value indicates that the respective row is an inner-join-type row: it is determined whether the respective row satisfies the filter from the original query. For example, the database management system determines whether inner-join-type row 420 satisfies the filter in Q1, which is T2.b2 (+)=6. Row 420 has the value '7' in the B2 column, which represents the values from T2.b2, and, as such, does not satisfy the filter predicate from Q1.

Modified-Anti-Join-Type (MAJ) Rows

At step 306, based on determining that the respective row does not satisfy the filter: one or more modified anti join actions, which comprise changing the respective indicator value, in an intermediate results set, to reflect that the respective row is a modified anti-join row, are performed. For example, in response to determining that row 420 has an IVal of '1' and does not satisfy the filter predicate, the database management system adjusts the IVal for row 420 to be '−1' to indicate that the row is a modified anti-join-type (MAJ) row. A MAJ row was originally an inner-join-type row in the join operation results set, but became an anti-join-type row after application of a filter predicate to the join operation results set.

After changing, in an intermediate result set for a query, one or more inner-join-type rows to MAJ rows, there are four MAJ scenarios (A)-(D) for each row of the include-all table(s) in the intermediate results of the query:

A. It has zero MAJ rows and one or more inner-join-type rows.

B. It has zero MAJ rows and one anti-join-type row.

C. It has one or more MAJ rows and one or more inner-join-type rows.

D. It has one or more MAJ rows and zero inner-join-type rows.

According to an embodiment, the MAJ row indicators in the intermediate results set are used to integrate the results set for the query. In the case of an include-all table row in scenarios (A) or (B), such a set of rows corresponding the row in the include-all table has no MAJ rows (i.e., is already integrated), and therefore requires no additional processing. In the case of an include-all table row in scenario (C), all MAJ rows should be discarded from the set of rows corresponding to the row in the include-all table in the results set, because no anti-join-type row should appear with an innerjoin-type row in an integrated result set. In the case of an include-all table row in scenario (D), all MAJ rows but one should be discarded from the set of rows corresponding to the row in the include-all table in the results set, because each qualified row of the include-all table must be preserved.

To illustrate, the following query, "Q1R", is an example rewrite of Q1 based on MV1:

```
(Q1R)
(1)   SELECT b1, c2, SUM(sm) sm, SUM(cnt) cnt
(2)   FROM (SELECT b1, c2, sm, cnt,
(3)         LEAD (IVAL, 1, 2) OVER (partition by T1RID order by
              IVAL) AS MR
(4)      FROM (SELECT T1RID, B1, SM, CNT,
(5)            (CASE WHEN (IVAL = 1 and b2 = 6) OR IVAL = 0
                 THEN c2 ELSE NULL
                 END) AS c2,
(6)            (CASE WHEN (IVAL = 1 and b2 = 6) OR IVAL = 0
                 THEN IVAL ELSE -1
                 END) AS IVAL
(7)         FROM MV1))
(8)   WHERE IVAL = 1 OR IVAL = 0 OR (IVAL = -1 and MR = 2)
(9)   GROUP BY b1, c2;
```

Specifically, Q1R is an example embodiment, in SQL, of a query rewrite for a many-to-many outer join for Q1, which includes a predicate over right table T2, as described above.

Example rewritten query Q1R utilizes the IVal values for the rows in MV1 to integrate an intermediate results set for Q1. At lines 4-7, Q1R generates a first set of intermediate results from MV1. At line 6 of Q1R, for a given row of the intermediate results set, the IVal of the row is set to -1 unless the row is an inner-join-type row (IVAL=1) that satisfies the filter over the right table (b2=6), or the row is an anti-join-type row (IVAL=0). Thus, the rows that were inner-join-type rows that do not satisfy the filter over the right table are marked as MAJ rows with IVals of '-1'.

Line 3 of Q1R uses the LEAD function, according to an embodiment. The LEAD function in Q1R is an existing ANSI-standard analytic function that returns the value of an expression from a succeeding or next row in the table or partition on which the function is applied. The 'partition by' clause is used to partition the rows of the intermediate results, produced by lines 4-7, into partitions based upon the unique values from table T1, i.e., the RID values. The 'order by' clause orders the data within each partition by IVal. Thus, the LEAD function allows specification of the value ('2' in Q1R) to be returned when the current row has no next or succeeding row in the partition. According to another embodiment, the existing ANSI-standard analytic function LAG could be used here with a descending sort specified in the ORDER BY clause. (Additional information about the LEAD and LAG functions may be found in Oracle Database Online Documentation, 10 g Release 2 (10.2), pages 5-85-5-86 and pages 5-81-5-82, respectively, the entire contents of which are hereby incorporated by reference as if fully set forth herein.)

Because the IVal for MAJ rows is '-1', the MAJ IVal sorts to the extreme (first or last position) of a list of all IVals (-1, 0, 1). This IVal selection allows the partitioning/ordering operations performed by the LEAD function to mark (with a '2' in the MR column of the intermediate results) exactly one MAJ row of a partition that contains only MAJ rows.

To further illustrate, FIG. 5 depicts an intermediate results set 500 as would be produced by the following query, "Q1R_INTERMEDIATE":

```
(Q1R_INTERMEDIATE)
SELECT T1RID, b1, c2, sm, cnt, IVAL,
      LEAD (IVAL, 1, 2) OVER (partition by T1RID order by IVAL)
      AS MR
FROM (SELECT T1RID, B1, SM, CNT,
      (CASE WHEN (IVAL = 1 and b2 = 6) OR IVAL = 0 THEN B2
         ELSE NULL
         END) AS B2,
      (CASE WHEN (IVAL = 1 and b2 = 6) OR IVAL = 0 THEN C2
         ELSE NULL
         END) AS C2,
      (CASE WHEN (IVAL = 1 and b2 = 6) OR IVAL = 0 THEN
         IVAL ELSE -1
         END) AS IVAL
   FROM MV1)
ORDER BY 1, 2, 6;
```

Note that, in intermediate results set 500, the values in the CNT column are all '1', which reflects the small sample size of the example tables rather than the value that CNT would necessarily reflect if the tables were larger.

Intermediate results set 500 (FIG. 5) illustrates the functioning of Q1R. Specifically, the LEAD function marks, with a '2' in the MR column, an extreme row, i.e., a first or last row, in each partition (which, in this example, is the last row in each partition). Because the rows are sorted by IVal, then the only time that an MAJ row will be marked with a '2' in the MR column is when there are only MAJ rows in the partition. For example, the partition for $T1_{RID}$ 'AI', rows 533-535, includes only MAJ rows, and only row 535 is marked with a '2' in the MR column.

According to an embodiment, in response to determining that a given row from MV1 is an inner-join-type row and the row does not satisfy the filter predicate from Q1, the database management system nullifies one or more columns, of the row in the intermediate results set, that come from the include-matching table. For example, at line 5 of Q1R, for a given row of the intermediate results set, data from the right table T2, i.e., c2, is nullified unless the row is an inner-join-type row (IVAL=1) that satisfies the filter over the right table (b2=6). Thus, the data from table T2, which does not satisfy the filter, is nullified in the intermediate results set.

According to an embodiment, the database management system also nullifies, in the intermediate results for MAJ rows, one or more aggregate function values defined on one or more columns of the include-matching table.

Many-to-Many or One-to-Many: Phase Four

Returning to the discussion of example query rewrite Q1R, line 8 of Q1R selects, from the intermediate results set on which the LEAD function was applied, all rows that have an IVal of '1' or '0', or that have both an IVal of '-1' and an MR mark of '2'. Thus, if a partition includes only MAJ rows, then only one of the rows is selected to be included in the results set of Q1R. Furthermore, all MAJ rows that occur, in the intermediate results set, with one or more inner-join-type rows having the same RID from table T1 are also removed from the query results set. As such, the query results set returned for Q1R is integrated.

Consider four groups of rows in intermediate results set 500 (FIG. 5), which relate to the four MAJ scenarios listed above.

In the group (rows 520-521) for $T1_{RID}$ equal to 'AA', there are no MAJ rows. This requires no special processing.

In the group (row 536) for $T1_{RID}$ equal to 'AJ', there are no MAJ rows. This requires no special processing.

In the group (rows 522-524) for T1$_{RID}$ equal to 'AB', which has both inner-join-type and MAJ rows, no MAJ rows have been marked, e.g., with a '2'. Therefore, all the MAJ rows will be discarded, since inner-join-type and [modified-] anti-join-type rows cannot occur together for the same left row.

In the group (rows 533-535) for T1$_{RID}$ equal to 'AI', which has only MAJ rows, one of the three MAJ rows have been marked, e.g., with a '2'. The other two unmarked MAJ rows will be discarded because a left row cannot appear as [modified-] anti-join-type row more than once.

Many-to-Many or One-to-Many: Phase Five

Subsequent to performing the steps represented in Q1R, the database management system performs filtering and joins with other tables that are not referenced in the MV definition, if needed. For example, the database management system receives the following query, "Q1C", which is similar to Q1, but also includes a filter over a table T3:

---
(Q1C)

SELECT T1.b1, T2.c2, SUM(T1.d1), COUNT(T1.d1)
FROM T1, T2, T3
WHERE T1.a1 = T2.a2 (+) and T2.b2 (+) = 6 and T1.b1 = T3.d3 and
T3.e = 5
GROUP BY T1.b1, T2.c2;

---

The database management system uses MV1 to execute Q1C in a similar manner to Q1 described above. After filtering out all unmarked MAJ rows from the intermediate results, the database management system performs filtering on T3 and a join with the intermediate results for Q1C based on the join and filter predicates that involve table T3, which is not included in the definition of MV1.

Many-to-Many or One-to-Many: Phase Six

Further, the database management system performs re-computation of group-by and aggregation on the group-by columns specified in the query, as needed. Specifically, if group-by results stored in the MV are used to rewrite a query that returns fewer group-by items, then a recomputation of group-by and aggregation is required. This recomputation "rolls up" finer-grained information in the MV into coarser-grained information requested by the query being rewritten. As such, group-by and aggregation results are re-computed after completion of phase 5.

Query Rewrite with a Many-to-One-Type One-Sided Outer-Join

Furthermore, the following represents an embodiment of a four-phase technique for rewriting a query, with a many-to-one one-sided outer-join, based on an MV (as indicated above).

1. Apply, on the MV filter, predicates defined on include-all and inner-joined tables in the query.
2. For each row of the MV and for each one-sided outer-join in the MV do: if it is an inner-join row, and the row does not satisfy the filter predicates specified on the include-matching table in the query, then (A) nullify the columns coming from the include-matching table and (B) nullify the aggregate functions defined on columns of the include-matching table.
3. Perform filtering and joins with other tables not referenced in the MV definition, if needed.
4. Do re-computation of group-by and aggregation on the group-by columns specified in the query.

According to an embodiment, if the query being rewritten specifies a many-to-one one-sided outer-join, then there is no requirement to include a unique column for the include-all table in the definition of the MV that is used to rewrite the query. For example, when a left outer-join predicate is an equality and the right table column in the outer-join predicate is unique, then a left table unique column need not be included in the MV definition, since each left row will match with at most one row from the right table. Therefore, each row from the left table will be represented in the query results exactly once.

Figure 6:
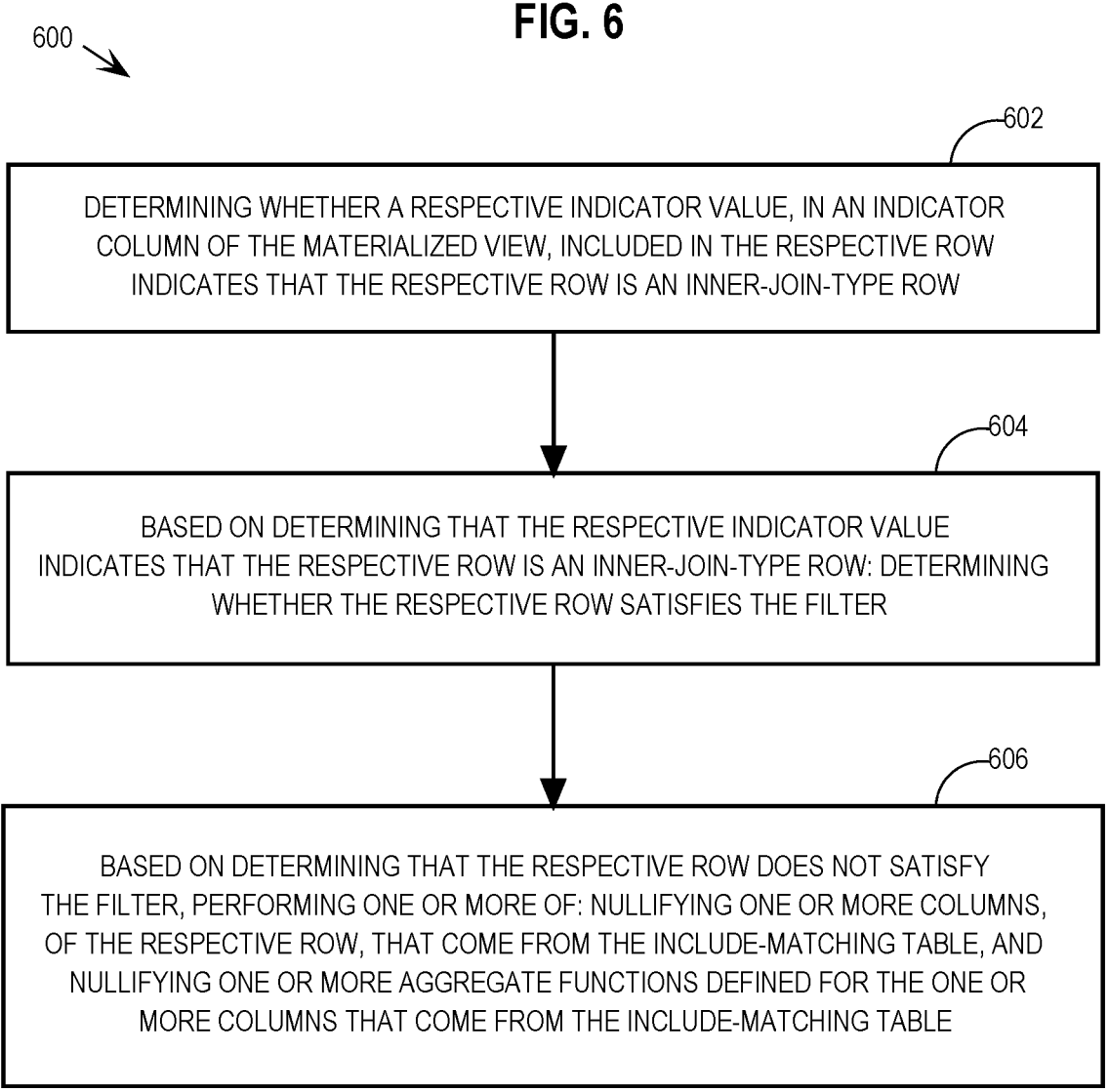
FIG. 6 depicts a flowchart for executing a rewritten query that utilizes a materialized view and involves a many-to-one-type one-sided join operation.

FIG. 6 depicts a flowchart 600 for executing a rewritten query that utilizes a materialized view and involves a many-to-one-type one-sided outer join operation, according to an embodiment. In flowchart 600, the steps are applicable to each row in a materialized view. Flowchart 600 is described using the following example query, "Q2", which includes a left outer-join predicate (F.a=D1.a (+)) with a left table F and a right table D1. Q2 further includes a filter predicate on right table D1 (D3.y (+)=5). Note that the join predicate in Q2 defines a many-to-one one-sided outer-join given that D1.a, which appears in the join predicate, is unique to table D1.

---
(Q2)

SELECT F.b, D1.x, SUM(F.m), COUNT(F.m)
FROM F, D1
WHERE F.a = D1.a (+) and D1.y (+) = 5
GROUP BY F.b, D1.x;

---

In this embodiment, a database being managed by the database management system, such as database 232 being managed by database management system 210, stores a materialized view, "MV2", with the following definition, where the definition of MV2 has no filter predicate and a many-to-one left outer-join predicate that matches the join predicate of Q2.

---
Create materialized view MV2 ... AS
SELECT F.b, D1.x, D1.y, SUM(F.m) sm, COUNT(F.m) cnt,
    NVL2(D1.rowid, 1, 0) IVAL
FROM F, D1
WHERE F.a = D1.a (+)
GROUP BY F.b, D1.x, D1.y, NVL2(D1.rowid, 1, 0);

---

FIG. 7 depicts example contents 700 of MV2. Note that MV2 includes anti-join-type rows 723, 724, and 729, which have null values for data from table D1 because they did not join with any rows from that table. Furthermore, because the join is many-to-one, each left table row matches with at most one right table row. MV2 includes an IVAL column, but does not include any column from the left table that is unique in that table, since embodiments do not require a unique value from table F, and a unique value from table F is not referred to in Q2.

The database management system runs Q2 over the database. In connection with executing example query Q2, a rewrite module of the database management system rewrites the query to retrieve data from MV2, which is based on the same join predicate as Q2 (F.a=D1.a (+)). According to an embodiment, MV2 is more general than Q2, i.e., MV2 does not include the filter predicate (in this case, on the right table) that is included in Q2.

To illustrate, the database management system rewrites Q2 as follows in example rewritten query Q2R:

(Q2R)

```
SELECT b, x, SUM(sm) sm, SUM(cnt) cnt
FROM (SELECT b, sm, cnt,
        (CASE WHEN (IVAL = 1 and y = 5) OR IVAL = 0 THEN x
        ELSE NULL
            END) AS x
    FROM MV2)
GROUP BY b, x;
```

As part of executing Q2 over the database, the database management system executes rewritten Q2R over the database.

Many-to-One: Phase One

According to an embodiment, prior to processing intermediate results from MV2 in connection with a query having the same join predicate as MV2, the database management system applies any filter predicates, from the query, that are defined on inner-joined or include-all tables (i.e., non-outer-joined tables) in the query, as described the phase 1 of the multi-phase technique for rewriting queries for many-to-one type outer joins indicated above. To illustrate, the database management system receives the following query, "Q2B", which is similar to Q2 but also includes a filter predicate over F.e (i.e., F.e=7).

(Q2B)

```
SELECT F.b, D1.x, SUM(F.m), COUNT(F.m)
FROM F, D1
WHERE F.a = D1.a (+) and D1.y (+) = 5 and F.e = 7
GROUP BY F.b, D1.x;
```

Thus, Q2B includes a filter predicate that is over the left (include-all) table of the outer join expression. According to an embodiment, the database management system applies the filter predicate for table F prior to performing the steps of flowchart 600.

Many-to-One: Phase Two

Returning to the discussion of flowchart 600 for executing a rewritten query that utilizes a materialized view and involves a many-to-one-type one-sided join operation, at step 602, it is determined whether a respective indicator value, in an indicator column of the materialized view, included in the respective row indicates that the respective row is an inner-join-type row. For example, the database management system determines whether a particular row, such as row 722 of MV2 contents 700, is associated with an IVal, from the IVAL column, that indicates that it is an inner-join-type row. Because row 722 is associated with an IVal of '1', it is an inner-join-type row.

At step 604, based on determining that the respective indicator value indicates that the respective row is an inner-join-type row: it is determined whether the respective row satisfies the filter indicated in the original query. For example, the database management system determines whether inner-join-type row 722 satisfies the filter in Q2, which is D1.y (+)=5. Row 722 has the value '8' in the Y column, which represents the values from D1.y, and, as such, does not satisfy the filter from Q1.

At step 606, based on determining that the respective row does not satisfy the filter, one or more of the following are performed: nullifying one or more columns, of the respective row, that come from the include-matching table, and nullifying one or more aggregate functions defined for the one or more columns that come from the include-matching table. For example, the database management system produces intermediate results for Q2R in which data from D1, such as D1.x, is nullified in rows that did not match the filter on data from the right table.

To illustrate, FIG. 7 depicts an intermediate results set 730 as would be calculated by the following query, "Q2R_B":

(Q2R_B)

```
SELECT b, x, y, sm, cnt, IVAL,
FROM (SELECT b, x, y, SM, CNT, IVAL
        (CASE WHEN IVAL = 1 and y = 5 THEN y ELSE NULL
        END) AS y,
        (CASE WHEN IVAL = 1 and y = 5 THEN x ELSE NULL
        END) AS x
    FROM MV2
    WHERE e = 7);
```

Intermediate results set 730 illustrates the functioning of Q2R. Specifically, as depicted in intermediate results set 730 of FIG. 7, rows 722, 725, and 727 did not match the filter criteria and, as such, the data from right table D1 (in columns 704 and 706) has been nullified from those rows, thereby effectively converting those rows to anti-join rows.

Furthermore, according to an embodiment, the database management system nullifies one or more aggregate functions, defined on columns of the right table.

Many-to-One: Phase Three

As with the many-to-many-type and one-to-many-type join operations, after the data from the right table is nullified from the results for Q2, the database management system performs filtering and joins with other tables not referenced in the MV definition, if needed. For example, the database management system receives the following query, "Q2C", which is similar to Q2, but also includes a filter over a table T3:

(Q2C)

```
SELECT F.b, D1.x, SUM(F.m), COUNT(F.m)
FROM F, D1, T3
WHERE F.a = D1.a (+) and D1.y (+) = 5 and F.b = T3.d and T3.e = 5
GROUP BY F.b, D1.x;
```

The database management system uses MV2 to execute Q2C in a similar manner to Q2 described above. After performance of phase 2, the database management system performs filtering on table T3 and its join with the intermediate results for Q2C based on the filter and join predicates that involve table T3, which is not included in the definition of MV2.

Many-to-One: Phase Four

Further, the database management system performs any needed re-computation of group-by and aggregation on the group-by columns specified in the query. Specifically, if group-by results stored in the MV are used to rewrite a query that returns fewer group-by items, then a recomputation of group-by and aggregation is required. This recomputation, or "rolling up", offine-grained information in the MV into coarse-grained information requested by the query being rewritten. As such, any affected group-by and aggregation results are re-computed after completion of phase 3.

Additional Examples

The following definition for "MV3" has no filter predicate and a many-to-many left outer-join predicate, a many-to-many inner join predicate, and a many-to-one inner join predicate. In MV3, the joining column D3.c is unique to table D3. The MV definition further contains unique columns from tables F and D2.

```
Create materialized view MV3 ... AS
SELECT F.rowid F_RID, F.d, F.p, D1.x, D2.rowid D2_RID, D2.z,
D1.y, D3.z,
    D2.s, SUM(F.m) sm, COUNT(F.m) cnt, NVL2(D1.rowid, 1, 0)
    IVAL
FROM F, D1, D2, D3
WHERE F.a = D1.a (+) and F.b = D2.b and F.c = D3.c
GROUP BY F.rowid, F.d, F.p, D1.x, D2.rowid, D2.z, D2.s, D1.y, D3.z,
    NVL2(D1.rowid, 1, 0);
```

The following query, "Q3", has a many-to-many left outer-join, a many-to-many inner join, and a many-to-one inner join.

(Q3)
```
SELECT F.d, D1.x, D2.z, SUM(F.m), COUNT(F.m)
FROM F, D1, D2, D3, D4
WHERE F.a = D1.a (+) and F.b = D2.b and F.c = D3.c and D1.y (+) = 7
and
    F.p = D4.p and F.d > 2;
GROUP BY F.d, D1.x, D2.z;
```

For the rewrite of Q3 with MV3, according to embodiments, the database management system generates the following query, "Q3R", where the 'partition by' clause of the LEAD function contains RIDs of tables F and D2. Further, MV3 is filtered by the predicate 'd>2' and joined with table D4.

(Q3R)
```
SELECT V.d, V.x, V.z, SUM(V.sm) sm, SUM(V.cnt) cnt
FROM (SELECT d, x, p, sm, cnt,
        LEAD(IVAL,1,2) OVER (partition by F_RID, D2_RID order
        by IVAL)
            AS MR
    FROM (SELECT F_RID, D2_RID, d, p, SM, CNT,
        (CASE WHEN (IVAL = 1 and y = 7) OR IVAL = 0 THEN
            x ELSE
                NULL END) AS x,
        (CASE WHEN (IVAL = 1 and y = 7) OR IVAL = 0 THEN
            IVAL
                ELSE -1 END) AS IVAL
        FROM MV3
        WHERE d > 2)) V, D4
```

(Q3R)
```
WHERE (IVAL = 1 OR IVAL = 0 OR (IVAL = -1 and MR = 2)) and
V.p = D4.p
GROUP BY V.d, V.x, V.z;
```

The following MV definition for "MV4" has no filter predicate and two many-to-many left outer-joins. Since there are two left outer-joins in the MV definition, there are two IVal columns (IVAL1 and IVAL2) in the MV, one for each right table. Further, because there are more than two tables in the definition of MV4 and also there are multiple one-sided outer joins in the MV definition, unique columns of all three tables (F, D1, and D2) are included in the MV definition (since both left outer-joins can duplicate the rows of the left table F), which are used to integrate the query results as shown below.

```
Create materialized view MV4 ... AS
SELECT F.rowid F_RID, D1.rowid D1_RID, D2.rowid D2_RID, F.d,
D1.x, D1.y
    D2.s, D2.z, SUM(F.m) sm, COUNT(F.m) cnt,
    NVL2(D1.rowid, 1, 0) IVAL1, NVL2(D2.rowid, 1, 0) IVAL2
FROM F, D1, D2
WHERE F.a = D1.a (+) and F.b = D2.b (+)
GROUP BY F.rowid, D1.rowid, D2.rowid, F.d, D1.x, D1.y, D2.s, D2.z,
    NVL2(D1.rowid, 1, 0), NVL2(D2.rowid, 1, 0);
```

The following query, "Q4", has two left outer-join predicates that match the join predicates from MV4, and also has filter predicates on all the three tables (F, D1, and D2).

(Q4)
```
SELECT F.d, D1.x, D2.z, SUM(F.m), COUNT(F.m)
FROM F, D1, D2
WHERE F.a = D1.a (+) and F.b = D2.b (+) and D1.y (+) = 5 and D2.s (+)
= 7
    and F.d = 11
GROUP BY F.d, D1.x, D2.z;
```

According to an embodiment, the database management system rewrites Q4 based on MV4, as the following query, "Q4R". Q4R includes two partition-by clauses, each of which (a) corresponds to a left outer-join in Q4, and (b) contains the unique columns of the other two tables.

(Q4R)
```
SELECT d, x, z, SUM(sm) sm, SUM(cnt) cnt
FROM (SELECT d, x, sm, cnt,
        LEAD(IVAL1,1,2) OVER (partition by F_RID, D2_RID order by IVAL1)
            AS MR1,
        LEAD(IVAL2,1,2) OVER (partition by F_RID, D1_RID order by IVAL2)
            AS MR2,
    FROM (SELECT F_RID, D1_RID, D2_RID, d, SM, CNT,
        (CASE WHEN (IVAL1 = 1 and y = 5) OR IVAL1 = 0 THEN x ELSE
            NULL END) AS x,
        (CASE WHEN (IVAL1 = 1 and y = 5) OR IVAL1 = 0 THEN IVAL1
            WHEN IVAL1 = 0 THEN IVAL1 ELSE -1 END) AS
            IVAL1,
        (CASE WHEN (IVAL2 = 1 and s = 7) OR IVAL2 = 0 THEN z ELSE
            NULL END) AS z,
        (CASE WHEN (IVAL2 = 1 and s = 7) OR IVAL2 = 0 THEN IVAL2
            WHEN IVAL2 = 0 THEN IVAL2 ELSE -1 END) AS
            IVAL2
```

(Q4R)

```
    FROM MV4
        WHERE d = 11))
WHERE (IVAL1 = 1 OR IVAL1 = 0 OR (IVAL1 = -1 and MR1 = 2)) and
      (IVAL2 = 1 OR IVAL2 = 0 OR (IVAL2 = -1 and MR2 = 2))
GROUP BY d, x, z;
```

For the rewrite of Q4, considering the left outer-join between F and D1, F can be seen as already being outer-joined with D2, and therefore the unique key of the table on the left is considered to be a composite key (F_RID, D2_RID). Similarly, considering the left outer-join between F and D2, F can be seen as already being outer-joined with D1, and therefore the unique key of the table on the left is considered to be a composite key (F_RID, D1_RID). This is the underlying reason for performing partition-by on the composite unique keys for each left outer-join in Q4R.

The following example query, "Q5", has an inner-join operation and a left outer-join operation that match the join predicates of MV4, as well as filter predicates on all the three tables (F, D1, and D2).

(Q5)

```
SELECT F.d, D1.x, D2.z, SUM(F.m), COUNT(F.m)
FROM F, D1, D2
WHERE F.a = D1.a and D1.y = 4 and F.b = D2.b (+) and D2.s (+) = 8
    and F.d = 16
GROUP BY F.d, D1.x, D2.z;
```

According to an embodiment, the database management system rewrites Q5 based on MV4, as the following query, "Q5R", where there is also an outer-to-inner join derivation.

(Q5R)

```
SELECT d, x, z, SUM(sm) sm, SUM(cnt) cnt
FROM (SELECT d, x, sm, cnt,
         LEAD(IVAL2,1,2) OVER (partition by F_RID, D1_RID order
             by IVAL2)
AS MR2,
    FROM (SELECT F_RID, D1_RID, D2_RID, d, SM, CNT,
             (CASE WHEN (IVAL2 = 1 and s = 8) OR IVAL2 = 0
             THEN z ELSE
                 NULL END) AS z,
             (CASE WHEN (IVAL2 = 1 and s = 8) OR IVAL2 = 0
             THEN IVAL2
                 ELSE -1 END) AS IVAL2
         FROM MV4
             WHERE d = 16 and IVAL1 = 1 and D1.y = 4))
WHERE (IVAL2 = 1 OR IVAL2 = 0 OR (IVAL2 = -1 and MR2 = 2))
GROUP BY d, x, z;
```

Application of Other Filter Predicates

According to one or more embodiments, one or more filter predicates included in the query to be rewritten may also be applied to an include-all table of the join operation or to an inner-join results set. According to an embodiment, prior to application of filter predicates defined on one or more include-matching tables of the query and/or prior to integrating query results, filter predicates defined on inner-join result sets or include-all tables in the original query are applied to the MV data. This is specified at the respective first phases of the multi-phase techniques for rewriting queries for both many-to-many and many-to-one type outer joins indicated above.

Unified Filter Predicates

A "unified" filter predicate is a filter predicate that (a) matches an expression with a plurality of values, or (b) encompasses multiple filter predicates. For example, a given type of query is generally issued with a predicate that compares a particular expression with one of a set of specific literal values (e.g., T2.b2=5; T2.b2=6; T2.b2=7; T2.b2=9; T2.b2=11). An MV with the following unified filter predicate, T2.b2 IN (5, 6, 7, 9, 11), which is semantically the same as "(T2.b2=5 OR T2.b2=6 OR T2.b2=7 OR T2.b2=9 OR T2.b2=11)", can be used to rewrite queries of the given type that has one of the filter predicates, T2.b2=5, T2.b2=6, T2.b2=7, T2.b2=9 or T2.b2=11. But, of course, the MV could not be used to rewrite a query of the given type having a filter predicate, e.g., T2.b2=17, whose literal value is not encompassed by the MV.

One advantage of generating an MV with a unified filter predicate is that the size of the MV is relatively small, and it can be used to rewrite some popular queries. The disadvantage is that the unified filter predicate (applicable to only a particular set of literal values) restricts the scope—ability to be used to rewrite a wide range of queries—of the MV. It is important to observe that whether an MV contains no filter predicate or it contains unified filter predicates, the query rewrite techniques described herein remain applicable.

Network Arrangement Architecture

FIG. 2 is a block diagram that depicts an example network arrangement 200 for a database management system 210, according to one or more embodiments. Network arrangement 200 includes a client device 240 and a database server computing device 220 communicatively coupled via a network 250. Network 250 may be implemented with any type of medium and/or mechanism that facilitates the exchange of information between client device 240 and server device 220. Example network arrangement 200 may include other devices, including client devices, server devices, storage devices, and display devices, according to one or more embodiments.

Client device 240 may be implemented by any type of computing device that is communicatively connected to network 250. In network arrangement 200, client device 240 is configured with a database client, which may be implemented in any number of ways, including as a stand-alone application running on client device 240, or as a plugin to a browser running at client device 240, etc. Client device 240 may be configured with other mechanisms, processes and functionalities, depending upon a particular implementation.

In network arrangement 200, server device 220 is configured with a database server instance 222. Server device 220 is implemented by any type of computing device that is capable of communicating with client device 240 over network 250 and also capable of running database server instance 222.

Database server instance 222 on server device 220 maintains access to and manages data in database 232 (i.e., on storage 230). According to one or more embodiments, access to a given database comprises access to (a) a set of disk drives storing data for the database, and (b) data blocks stored thereon. Database 232 may reside in any type of storage 230, including volatile and non-volatile storage, e.g., random access memory (RAM), one or more hard disks, main memory, etc.

Any of the functionality attributed to database server instance 222 or database management system 210 herein may be performed by any other entity, which may or may not be depicted in network arrangement 200, according to one or more embodiments. Server device 220 may be configured with other mechanisms, processes and functionalities, depending upon a particular implementation.

In an embodiment, each of the processes and/or functionality described in connection with database server instance 222, database management system 210, and/or database 232 are performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Database Overview

Embodiments of the present invention are used in the context of database management systems (DBMSs). Therefore, a description of an example DBMS, such as database management system 210, is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines the totality of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11 g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/WL is a common extension of SQL used when manipulating XML data in an object-relational database.

A single-node database system, such as system 210 as depicted in FIG. 2, comprises a single node that runs a database server instance that accesses and manages the database. According to an embodiment, system 210 is implemented as a multi-node database management system, which is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Query Optimization

As used herein, a query is considered "rewritten" when the query is (a) rewritten from a first expression or representation to a second expression or representation, e.g., using one or more materialized views, (b) received in a manner that specifies or indicates a first set of operations, such as a first expression, representation, or execution plan, and executed using a second set of operations, such as the operations specified by or indicated by a second expression, representation, or execution plan, or (c) received in a manner that specifies or indicates a first set of operations, and planned for execution using a second set of operations.

Two queries or execution plans are semantically equivalent to each other when the two queries or execution plans, if executed, would produce equivalent result sets, even if the result sets are assembled in different manners by the two queries or execution plans. Execution of a query is semantically equivalent to a query or execution plan if the query execution produces a result set that is equivalent to the one that would be produced by that query or execution plan, if executed.

A query optimizer may optimize a query by rewriting the query. In general, the query optimizer, or a rewrite module of the database server instance, rewrites a query into another query that produces the same result and that can potentially be executed more efficiently, i.e., one for which a potentially more efficient and/or less costly execution plan can be generated. A query may be rewritten by manipulating any internal representation of the query, including any copy thereof, to form a rewritten query or a rewritten query representation. Alternatively, and/or in addition, a query may be rewritten by generating a different but semantically equivalent database statement.

Alternatives or Extensions

One or more of the functions attributed to any process described herein, according to one or more embodiments, may be performed any other logical or physical entity, according to one or more embodiments. In an embodiment, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
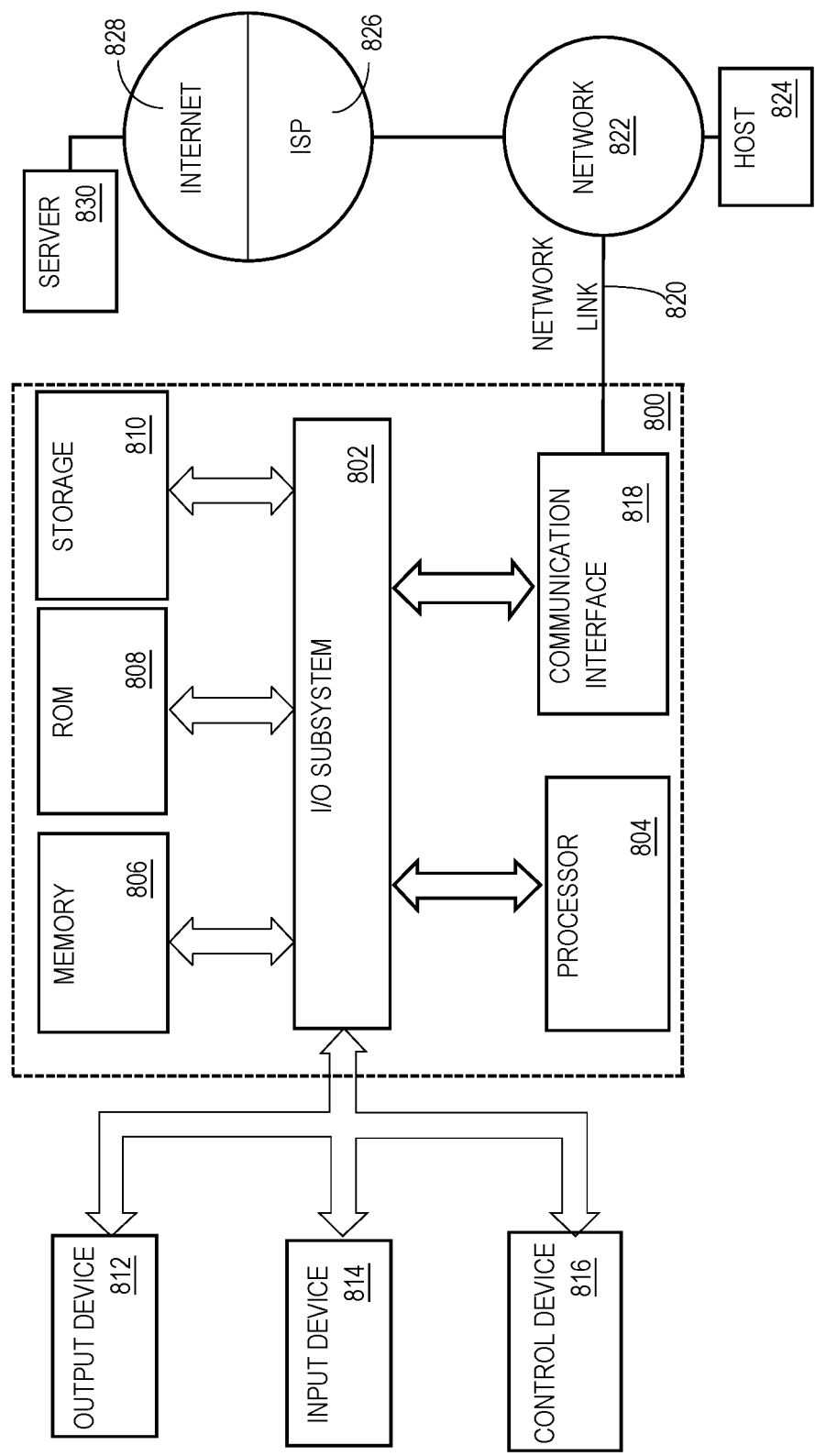
FIG. 8 is a block diagram of a computer system on which embodiments may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile median includes, for example, optical disks, magnetic disks, or solid-state drives, such as storage device 810. Volatile median includes dynamic memory, such as main memory 806. Common forms of storage median include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission median includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Software Overview

Figure 9:
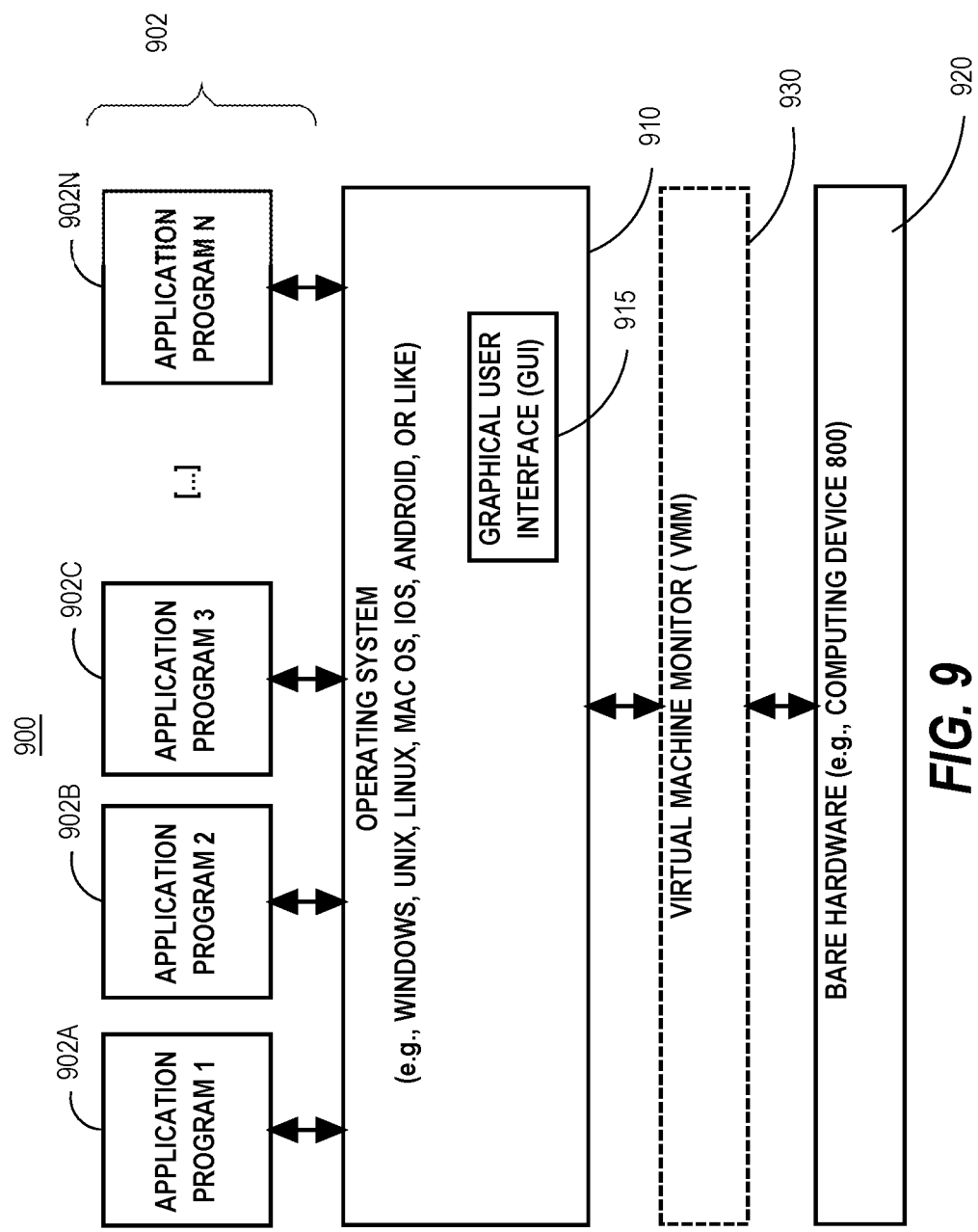
FIG. 9 depicts a software system that may be used in an embodiment.

FIG. 9 is a block diagram of a basic software system 900 that may be employed for controlling the operation of computer system 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computer system 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 900. The applications or other software intended for use on computer system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of computer system 800. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the computer system 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of computer system 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
    storing, by a database management system, a materialized view that is based on a materialized view definition that includes a one-sided outer-join operation, with one or more join predicates, over an include-all table and an include-matching table;
    wherein the materialized view includes all rows of the include-all table;
    wherein the materialized view includes one or more rows, of the include-matching table, that satisfy the one or more join predicates;
    after storing the materialized view, receiving, by the database management system, a query over a plurality of tables in a database managed by the database management system;
    wherein the query includes:
        the one-sided outer-join operation over the include-all table and the include-matching table, and
        a filter, over the include-matching table, that is not included in the materialized view definition;
    in response to determining that the query includes the one-sided join operation, rewriting the query to produce a rewritten query that:
        produces an intermediate results set, wherein producing the intermediate results set comprises applying the filter to the one or more rows included in the materialized view, and
        retrieves data from the intermediate results set; and
    executing the rewritten query to:
        apply the filter to the one or more rows included in the materialized view to produce the intermediate results set, and
        produce a results set based on data retrieved from the intermediate results set;
    wherein the method is performed by one or more computing devices.

2. The computer-executed method of claim 1, wherein:
the materialized view comprises a particular plurality of rows that corresponds to a particular row of the include-all table;
said executing the rewritten query comprises:
  determining, for each row of the particular plurality of rows, whether said each row satisfies the filter;
  if all rows, of the particular plurality of rows, do not satisfy the filter, preserving only one row, of the particular plurality of rows, in a result set of the rewritten query; and
  if one or more rows, of the particular plurality of rows, satisfy the filter, preserving the one or more rows, of the particular plurality of rows, in a result set of the rewritten query.

3. The computer-executed method of claim 1, wherein:
the materialized view comprises a plurality of rows;
the materialized view includes an indicator column that stores indicator values that indicate one of (a) an inner-join-type row, or (b) an anti-join-type row;
said executing the rewritten query comprises, for each row of the plurality of rows:
  determining whether an indicator value, in the indicator column, included in said each row indicates that said each row is an inner-join-type row,
  based on determining that the indicator value indicates that said each row is an inner-join-type row:
    determining whether said each row satisfies the filter;
    based on determining that said each row does not satisfy the filter:
      performing one or more modified anti-join actions that comprise changing the indicator value, in a row, corresponding to said each row, in the intermediate results set, to reflect that said each row is a modified anti-join-type row.

4. The computer-executed method of claim 3, wherein said performing the one or more modified anti-join actions further comprise one or more of:
  nullifying one or more columns, of a particular row of the plurality of rows, that come from the include-matching table; and
  nullifying one or more aggregate function values defined for one or more columns that come from the include-matching table.

5. The computer-executed method of claim 3, wherein said executing the rewritten query comprises:
  partitioning the intermediate results set based on a unique column of the include-all table to produce a plurality of partitions of the intermediate results set;
  performing one or more marking actions by, for each partition of the plurality of partitions: if said each partition includes only modified anti-join-type rows, marking a single row of said each partition; and
  filtering, from the intermediate results set, modified anti-join-type rows that are unmarked.

6. The computer-executed method of claim 5, wherein:
indicator values, in the indicator column, are ordered such that a modified anti-join-type indicator value sorts to an extreme of a list of indicator values that includes the modified anti-join-type indicator value, an inner-join-type indicator value, and an anti-join-type indicator value;
the method further comprises:
  ordering rows in each partition, of the plurality of partitions, based on indicator values of the rows in said each partition such that modified anti-join-type indicator values are sorted to the extreme of said each partition,
  wherein the one or more marking actions further comprises using an analytic function to mark an extreme row of each partition, of the plurality of partitions.

7. The computer-executed method of claim 3, wherein the indicator column is an inner-join indicator column.

8. The computer-executed method of claim 1, wherein:
the materialized view comprises a plurality of rows;
the materialized view includes an indicator column that stores indicator values that indicate one of (a) an inner-join-type row, or (b) an anti-join-type row;
said executing the rewritten query comprises, for each row of the plurality of rows:
  determining whether an indicator value, in the indicator column, included in said each row indicates that said each row is an inner-join-type row,
  based on determining that the indicator value included in said each row indicates that said each row is an inner-join-type row:
    determining whether said each row satisfies the filter;
    based on determining that said each row does not satisfy the filter, performing one or more of:
      nullifying one or more columns, of said each row, that come from the include-matching table, and
      nullifying one or more aggregate functions defined for the one or more columns that come from the include-matching table.

9. The computer-executed method of claim 1, wherein the query further includes a second filter over the include-all table.

10. The computer-executed method of claim 1, wherein the query further includes one or more additional include-all tables.

11. The computer-executed method of claim 1, wherein the query further includes one or more additional include-matching tables.

12. One or more non-transitory computer-readable media storing instructions that, when executed by one or more processors, cause:
  storing, by a database management system, a materialized view that is based on a materialized view definition that includes a one-sided outer-join operation, with one or more join predicates, over an include-all table and an include-matching table;
  wherein the materialized view includes all rows of the include-all table;
  wherein the materialized view includes one or more rows, of the include-matching table, that satisfy the one or more join predicates;
  after storing the materialized view, receiving, by the database management system, a query over a plurality of tables in a database managed by the database management system;
  wherein the query includes:
    the one-sided outer-join operation over the include-all table and the include-matching table, and
    a filter, over the include-matching table, that is not included in the materialized view definition;
  in response to determining that the query includes the one-sided join operation, rewriting the query to produce a rewritten query that:
    produces an intermediate results set, wherein producing the intermediate results set comprises applying the filter to the one or more rows included in the materialized view, and retrieves data from the intermediate results set; and
executing the rewritten query to:
apply the filter to the one or more rows included in the materialized view to produce the intermediate results set, and
produce a results set based on data retrieved from the intermediate results set.

13. The one or more non-transitory computer-readable media of claim 12, wherein:
the materialized view comprises a particular plurality of rows that corresponds to a particular row of the include-all table;
said executing the rewritten query comprises:
determining, for each row of the particular plurality of rows, whether said each row satisfies the filter;
if all rows, of the particular plurality of rows, do not satisfy the filter, preserving only one row, of the particular plurality of rows, in a result set of the rewritten query; and
if one or more rows, of the particular plurality of rows, satisfy the filter, preserving the one or more rows, of the particular plurality of rows, in a result set of the rewritten query.

14. The one or more non-transitory computer-readable media of claim 12, wherein:
the materialized view comprises a plurality of rows;
the materialized view includes an indicator column that stores indicator values that indicate one of (a) an inner-join-type row, or (b) an anti-join-type row;
said executing the rewritten query comprises, for each row of the plurality of rows:
determining whether an indicator value, in the indicator column, included in said each row indicates that said each row is an inner-join-type row,
based on determining that the indicator value indicates that said each row is an inner-join-type row:
determining whether said each row satisfies the filter;
based on determining that said each row does not satisfy the filter:
performing one or more modified anti-join actions that comprise changing the indicator value, in a row, corresponding to said each row, in the intermediate results set, to reflect that said each row is a modified anti-join-type row.

15. The one or more non-transitory computer-readable media of claim 14, wherein said performing the one or more modified anti-join actions further comprise one or more of:
nullifying one or more columns, of a particular row of the plurality of rows, that come from the include-matching table; and
nullifying one or more aggregate function values defined for one or more columns that come from the include-matching table.

16. The one or more non-transitory computer-readable media of claim 14, wherein said executing the rewritten query comprises:
partitioning the intermediate results set based on a unique column of the include-all table to produce a plurality of partitions of the intermediate results set;
performing one or more marking actions by, for each partition of the plurality of partitions: if said each partition includes only modified anti-join-type rows, marking a single row of said each partition; and
filtering, from the intermediate results set, modified anti-join-type rows that are unmarked.

17. The one or more non-transitory computer-readable media of claim 16, wherein:
indicator values, in the indicator column, are ordered such that a modified anti-join-type indicator value sorts to an extreme of a list of indicator values that includes the modified anti-join-type indicator value, an inner-join-type indicator value, and an anti-join-type indicator value;
the instructions further comprise instructions that, when executed by one or more processors, cause:
ordering rows in each partition, of the plurality of partitions, based on indicator values of the rows in said each partition such that modified anti-join-type indicator values are sorted to the extreme of said each partition,
wherein the one or more marking actions further comprises using an analytic function to mark an extreme row of each partition, of the plurality of partitions.

18. The one or more non-transitory computer-readable media of claim 14, wherein the indicator column is an inner-join indicator column.

19. The one or more non-transitory computer-readable media of claim 12, wherein:
the materialized view comprises a plurality of rows;
the materialized view includes an indicator column that stores indicator values that indicate one of (a) an inner-join-type row, or (b) an anti-join-type row;
said executing the rewritten query comprises, for each row of the plurality of rows:
determining whether an indicator value, in the indicator column, included in said each row indicates that said each row is an inner-join-type row,
based on determining that the indicator value included in said each row indicates that said each row is an inner-join-type row:
determining whether said each row satisfies the filter;
based on determining that said each row does not satisfy the filter, performing one or more of:
nullifying one or more columns, of said each row, that come from the include-matching table, and
nullifying one or more aggregate functions defined for the one or more columns that come from the include-matching table.

20. The one or more non-transitory computer-readable media of claim 12, wherein the query further includes a second filter over the include-all table.

21. The one or more non-transitory computer-readable media of claim 12, wherein the query further includes one or more additional include-all tables.

22. The one or more non-transitory computer-readable media of claim 12, wherein the query further includes one or more additional include-matching tables.

* * * * *

UNITED STATES PATENT AND TRADEMARK OFFICE
CERTIFICATE OF CORRECTION

PATENT NO. : 11,086,868 B2  
APPLICATION NO. : 16/667527  
DATED : August 10, 2021  
INVENTOR(S) : Ahmed et al.

Page 1 of 1

It is certified that error appears in the above-identified patent and that said Letters Patent is hereby corrected as shown below:

On the Title Page

On page 2, Column 1, under Other Publications, Line 10, delete "arxiv.oorg," and insert -- arxiv.org, --, therefor.

In the Specification

In Column 5, Line 26, after "MV" insert -- . --.

In Column 5, Line 65, delete ""Q1 ANSI LEFT"" and insert -- "Q1_ANSI_LEFT" --, therefor.

In Column 5, Line 66, delete ""Q1 ANSI RIGHT"" and insert -- "Q1_ANSI_RIGHT" --, therefor.

In Column 6, Line 1, delete "Q1 ANSI LEFT," and insert -- Q1_ANSI_LEFT, --, therefor.

In Column 6, Lines 1-2, delete "Q1 ANSI RIGHT" and insert -- Q1_ANSI_RIGHT --, therefor.

In Column 12, Line 19, delete "(D3.y" and insert -- (D1.y --, therefor.

In Column 14, Line 58, delete "offine-grained" and insert -- finer-grained --, therefor.

In Column 16, Line 23, after "D1.y" insert -- , --.

In Column 20, Line 10, delete "SQL/WL" and insert -- SQL/XML --, therefor.

Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*